US006994752B2

(12) United States Patent
Estrada et al.

(10) Patent No.: US 6,994,752 B2
(45) Date of Patent: Feb. 7, 2006

(54) METHOD AND APPARATUS FOR MANUFACTURING DECORATIVE MOLDINGS

(75) Inventors: Jorge Enrique Sayago Estrada, Fracc. Altabrisa Tijuana (MX); Ricardo Laborin Valdez, Col. Madero Sur Tijuana (MX)

(73) Assignee: Coraza Industrial, S.A. DE C.V., Baja California (MX)

( * ) Notice: Subject to any disclaimer, the term of this patent is extended or adjusted under 35 U.S.C. 154(b) by 65 days.

(21) Appl. No.: 10/676,693

(22) Filed: Oct. 1, 2003

(65) Prior Publication Data

US 2004/0256756 A1      Dec. 23, 2004

(30) Foreign Application Priority Data

Jun. 17, 2003    (MX) .................... PA/a/2003/005530

(51) Int. Cl.
*B05C 11/02* (2006.01)
(52) U.S. Cl. .................... 118/125; 425/113; 425/114
(58) Field of Classification Search .......... 118/125, 118/DIG. 18, 413, 411, 415; 425/113, 114, 425/92–94, 102, 104, 106
See application file for complete search history.

(56) References Cited

U.S. PATENT DOCUMENTS

| 3,084,662 A | * | 4/1963 | Badger .................... 118/50 |
| 4,165,957 A | * | 8/1979 | Kertscher .................. 425/113 |
| 5,672,391 A | | 9/1997 | Santarossa |
| 6,206,965 B1 | | 3/2001 | Rao et al. |
| 6,660,086 B1 | * | 12/2003 | Prince et al. .............. 118/125 |

FOREIGN PATENT DOCUMENTS

CA       2184205       3/1997

* cited by examiner

Primary Examiner—Brenda Lamb
(74) Attorney, Agent, or Firm—Honigman Miller Schwartz and Cohn LLP (57) ABSTRACT

The present invention consists of a method and apparatus to efficiently coat architectonic moldings made of diverse materials, providing a versatile, and continuous production, where polystyrene stands out from different types of coating materials. The apparatus consists of a leveled table on which the pieces to be coated are placed, aligned to one or more guiding strips, and moved by a two-way drive system. The pieces are introduced into an extrusion chamber, wherein the coating material adheres to them, according to the desired thickness. Due to their characteristics, the apparatus and method of the present invention offer the following advantages: (1) versatility in the production because it allows simultaneous production of two or more models of different architectonic moldings; (2) efficiency in the production because it is possible to introduce two or more pieces to be coated towards the extrusion chambers per cycle of the apparatus; (3) efficiency in the production when maintaining a continuous process of production, operating each extrusion chamber independently, such that the method and apparatus continue operating during the time of preparation (change of model) of either of the extrusion chambers; and (4) greater possibilities in the characteristics of the applied coatings, because the pieces can be coated with one or two coating materials, according to what is required, during the same period of time, that is to say, during the passage of said pieces through the extrusion chambers.

34 Claims, 8 Drawing Sheets

METHOD AND APPARATUS FOR MANUFACTURING DECORATIVE MOLDINGS

FIELD OF THE INVENTION

This invention is related to the field of architecture. Particularly, the invention relates to a method, and apparatus for manufacturing (architectonic) decorative moldings.

BACKGROUND OF THE INVENTION

The architectonic moldings are decorative parts used to provide certain volume to the surfaces, granting aesthetic value to walls and other elements in all types of constructions. Although architectonic moldings are used to a great extent for indoor and outdoor constructions, the latter require of deterioration-resistant materials, which are to be exposed to rain, sun and, in general, weathering deterioration. Due to the above, in the construction of this type of outdoor moldings, the use of materials such as cement is common. In contrast, architectonic moldings for interiors allow a greater variety of materials, such as wood, plaster, plastic, among others.

The visible and exposed part of the architectonic molding is usually decorated or finished to give a pleasant aspect, wherein a smooth and uniform surface generally corresponds to the preferred finishing.

However, the traditional methods for the construction of outdoor architectonic moldings include in-site manufacturing in site these items by means of techniques as the use of wood molds into which concrete is casted and the use of a rake that is swept by the cement mixtures and creates the moldings in-site, just where they will remain installed.

Lately, the use of coated expanded polystyrene has replaced these methods, being less time consuming and easier in construction.

Particularly, for polystyrene moldings made in site the typical method consists in attaching section of polystyrene to the outer wall, placing a section of fiberglass mesh, and coating it with some appropriate material. This is done manually with the aid of spatulas or blades. The limitations of this method is that the thickness of the applied coating is usually uneven, with an irregular finishing of texture, in addition, the corners and contours of the molding present a curved finishing in the section where straight contours are desired, as a result of the technique of brush and blade which is usually used. All these causes the molding to lack of adequate general resistance, and therefore fissures and cracking tend to appear, in addition to showing a general low quality appearance.

Additionally, all the methods described for manufacturing outdoor moldings, require an intense and specialized manual dexterity, reason why they are expensive, hardly available, and practically impossible to use by the general public due the requirement of experience and hand labor specialization.

Recently, methods and equipment have appeared tending to automate and to improve the process of coating the polystyrene pieces, such as those used as architectonic moldings. Those described in Canadian Patent No. CA 2.184.205 and U.S. Pat. No. 6,206,965 stand out.

The Canadian patent discloses a method and apparatus to apply a coating to the surface of a piece. In said method, the piece to be coated slides through an open coating chamber, where the material is adhered to the piece by virtue of the characteristics and weight of material itself. The piece is guided and moved on top of a table, by the action of power-driven sideboards, that introduce it into the coating chamber having contoured entrance ports that match the shape of the piece, and an exit port similarly shaped to match the piece shape, but proportionally bigger in such a way that the difference between the dimensions of the piece and the exit port correspond to the thickness of the coating.

U.S. Pat. No. 6,206,965 basically uses the same principle of the coating chamber, but with the difference that this one is closed and the material it is provided by means of controlled pressure conditions; in addition, the piece is moved by the action of a conveying band, located in the horizontal part of the table.

The methods and apparatuses disclosed in Canadian Patent No. CA 2.184.205, and U.S. Pat. No. 6,206,965 work relatively well if the critical aspects of the process are taken care of, namely keeping control of the accuracy of the dimensions between the piece to be coated, the entrance port and the exit port of the chamber; keeping constant the movement of the piece, without vertical nor horizontal variations; and keeping suitable consistency and workability of the coating material. Nevertheless, these apparatuses and methods have some disadvantages, they have a low versatility, because both are unidirectional, and are designed to only provide a single model or shape of the molding per apparatus, and per cycle of operation.

Despite what is previously described in the technical field, there is still a need for a method and apparatus for producing at a commercial scale and low cost architectonic moldings for indoor and outdoor use, that are easy to install by non-skilled persons, versatile, productive, reliable, and simple in its operation.

SUMMARY OF THE INVENTION

The present invention is a method and apparatus to efficiently coat pieces of different materials, advantageously the apparatus of the invention is capable of coating several pieces the same or different shape at the same time thereby obtaining a higher production (more moldings by apparatus per time), and versatility (production of different molding models simultaneously) compared to the apparatuses and methods of the prior art. In the present invention, the term "piece" refers to the raw material and the intermediate products that, after running through the apparatus and method of the present invention result in a decorative molding.

The apparatus (29) of the present invention consists of a leveled table (1) having a low friction surface (2) and being high resistance to humidity. On the low friction surface (2) of the leveled table (1) is located a guiding strip (4) of rectangular shape, preferably made with a high resistance and durable material. The guiding strips (4) are installed in the locking grooves locking groove (6), which are parallel to each other, and being inserted flushed to the surface of the leveled table (1), in such a way that the guiding strip (4) can be installed and removed from the locking groove (6) easily. Placing of the guiding strips (4) into the locking groove (6) is made by means of locking devices (5) that can manually be manipulated for quick installation or removal of the guiding strips (4).

The piece to be coated (24) must be previously grooved originating a guide opening (25) at the flat section (26) of the piece (24), by means of a cutting or molding process. The dimensions of the guide opening (25) shall correspond to those of the guiding strip (4), in such a way that when the piece is being placed (24) on the guiding strip (4) both components adequately match, and allows the piece (24) to accurately move on the guiding strip (4) when horizontally applying pressure in one of the lateral ends (30) of said piece (24), the lateral ends being vertically cut.

The apparatus (29) of the present invention moves the piece to be coated (24) by means of a blade (10) superposing in a small distance (40) over the guiding strip (4), preferably a few millimeters, and upon placing the piece to be coated (24) on this guiding strip (4) one of the ends (30) of the piece to be coated (24) and one of the sides of the blade (10) get into contact, being both sides flat and vertically parallel between each other (41). This blade (10) is fixed to a drive system (7) by means of a support arm (9). The drive system (7) can be electromechanical, pneumatic or a combination of both; and clears off the low friction surface (2) of the leveled table (1).

The drive system (7) is activated by an operator who agilely places the pieces to be coated (24) on the guiding strip (4), and immediately activates the starting control (8) of the drive system (7). The drive system (7) moves said piece to be coated (24), which in turn pushes a previously placed piece to be coated (42) towards an extrusion chamber (11), containing inside the coating material (27). The previously placed piece to be coated (42) is the one that leaves the extrusion chamber now completely coated (11), whereas the piece to be coated (24) which has just been placed, is partially inside the extrusion chamber (11), sealing the entrance cavity (13) and the exit cavity (14) of the same, in such a way that the semi-liquid coating material (27) is not spilled inside in the extrusion chamber (11).

When concluding the previous stage, you can choose to reset the blade (10) to its previous position to place another piece to be coated (24) to be fed into the same extrusion chamber (11) and to continue the production process with the use of a single extrusion chamber (11) or, you can decide to use a bi-directional system with double extrusion chamber (11 and 45). In said bi-directional system, the operator places another piece to be coated (24) on the same guiding strip (4), but now at the other side of the blade (10), thereby initiating a new run backwards, moving another pair of pieces to be coated (24) towards a second extrusion chamber (45), placed on the opposite side of first one (11). The pieces to be coated (24, 42 and 46) may or may not be of the same shape as the first one.

The apparatus (29) of the present invention significantly increases productivity, because a trained operator, with certain experience and depending on the size of the pieces to be coated (24), can place two or more pieces to be coated (24) on two or more guiding strips (4), in such a way that the extrusion chambers (11 and 45) can be fed simultaneously with two or more pieces to be coated (24, 42 and 46) during each run.

Another great advantage of the apparatus (29) of the present invention is that both extrusion chambers (11 and 45) operate individually, so that the apparatus (29) of the present invention does not stop the production process when one of the extrusion chambers (11 and 45) has to be changed for any modification or when initiating the production of another model to be coated (24).

The extrusion chambers (11 and 45) of the present invention (29) consist of open drawers having two cavities aligned in parallel thereby forming the extrusion chamber (11 and 45), the shape or profile of which corresponds to that of the piece to be coated (24, 42 and 46). The outer section of the wall of the entrance cavity (13) has a proportionally bigger shape in relation to the shape of the piece to be coated (24), which gets smaller as the wall of the entrance cavity (13) is traversed, and until the piece reaches the inner section of the wall of the entrance cavity (13), the dimension at this section exactly correspond to those of the piece to be coated (24). This feature cause that the piece to be coated (24) be received by the outer section and, in case of coming uneven or misaligned during its run, the apparatus (29) of the present invention fixes said unevenness or misalignment at the moment the piece (24) enters into the extrusion chamber (11).

However, the thickness of the coating material (52) is determined by the exit cavity (14) having an outer section proportionally equal to the shape or profile of the piece to be coated (24), but increasing according to the desired thickness of the coating material (52). The entrance cavity (13) and exit cavity (14) that comprise the extrusion chamber (11) can be removed and replaced, based on the number of entrance (13) and exit (14) cavities which are required, as well as the desired shape, during the operation of the apparatus (29) of the present invention.

In an embodiment of the present invention (29), the extrusion chamber (11) can be modified to obtain a certain thickness, finishing and reinforcement on the pieces to be coated (24). This embodiment consists of adding an intermediate cavity (17) to the extrusion chamber (11) creating thereby two independent deposits (35) for the coating material (27 and 36), which allows coating the piece (24) simultaneously with two different materials.

Feeding of the coating material into the extrusion chamber (11) is carried out by a feeding pump (18), which moves the coating material (27) through feeding pipes (20). The flow of the coating material (27) is determined by the feeding speed (37), which in turn is controlled by a motor regulator (21) in feeding pump. The feeding speed (37) of the coating material (27) into the extrusion chamber (11) will be determined depending on the size and number of pieces to be coated (24).

The apparatus (29) of the present invention allows giving a great range of characteristics to the coating material (27) due to its capability of feeding the coating material (27) and setting the speed of the run of the drive system (7). Because of this, it can handle different densities, viscosities, and other characteristics of the coating material (27), to obtain very specific appearance results and properties in the coating of the architectonic molding.

The method of the present invention for coating architectonic moldings consists in the following steps:
1. Determining of the flow of the coating material.
2. Placing the piece to be coated on the leveled table.
3. Moving the piece to be coated into the extrusion chamber.
4. Coating the piece.
5. Drying the coated piece.

The first stage of the process of the present invention consists of determining the flow volume of the coating material (27) that is deposited at the extrusion chamber (11), as well as the manual or automatic form of feeding. In practice, usually the manual mode is used to carry out the preparation of the process, and once the conditions of operation in series are obtained, it changes to of automatic feeding. Nevertheless, any form of controlling feeding is effective.

The second stage of the process of the present invention consists of placing the piece to be coated (24), previously grooved, on the guiding strip (4) of the leveled table (1), taking care that it completely matches the guide opening (25) of the piece to be coated (24) and the guiding strip (4) on which the piece is moved (24). In this stage, it is necessary that the piece to be coated (24) is placed in such a way that one of the ends (30) of the piece to be coated (24) is in contact with one of the sides of the blade (10).

The third stage of the process of the present invention consists of moving the piece to be coated (24) into the extrusion chamber (11) by means of activation of the drive system (7), which moves the piece to be coated (24) pushing it by blade (10) contacting one of the ends (30) of the piece to be coated (24). During the movement, the piece to be coated (24) is received by the entrance cavity (13), which has a flared shape based on the shape of the piece to be coated (24), thereby aligning the piece (24) to the cavities of the extrusion chamber (11).

The fourth stage of the process of the present invention consists of coating (27) the piece (24) by the passing the piece (24) through the extrusion chamber (11), and the coating material (27) properly adheres to the exposed surface of the piece (24).

The fifth stage of the process of the present invention consists in drying the pieces just coated; this may be done by the following alternatives. The first alternative consists in horizontally placing the coated piece in drying cars specially designed to contain the coated piece during the process of aging of the coating material.

Another embodiment of the drying stage consists of giving continuity to the manufacture process, by continuing movement of the coated piece leaving the extrusion chamber, by means of conveying bands which receive the coated piece, and take it immediately to a drying furnace, where the piece undergoes an accelerated drying process, after which it is possible to continue towards the stages of finishing and packing.

DESCRIPTION OF THE PREFERRED EMBODIMENTS

The present invention solves the problem of limitations in versatility and low productivity of the methods and apparatuses of the prior art in the process of coating of pieces of different materials previously cut or molded, amongst which polystyrene stands out because of its lightweight and ease of handling. The pieces are coated with a finishing and protecting coating that adheres to them. The method and apparatus of the present invention is more efficient and simpler to perform the task of coating the pieces to be used as architectonic moldings at commercial scale, designed to be handled and installed by persons not skilled in the area of installation of this type of products. The obtained coated pieces have a coated and decorative area, ready to be exposed to indoor or outdoor conditions or weathering, and having a non-coated area, which will be adhered to the desired surface.

The method and apparatus of the present invention are designed to efficiently coat pieces of different materials, for example polystyrene, to which generally and previously, but not necessarily, a fiberglass mesh having the adhesive already included in the mesh itself is adhered. Part of the advantages of the apparatus and process is the possibility of coating one or more pieces of different shapes during the cycle of operation thereby allowing the production of more moldings per apparatus at a time, and offering more versatility (production of different molding models simultaneously) in comparison to the coating apparatuses and methods in the art.

In reference to FIGS. 1, 2, 3, 4, 5 and 6, the apparatus (29) of the present invention comprises the following components:

a) Leveled table (1) including a low friction surface (2), independent level settings (3), one or more guiding strips (4), guiding strip locking devices (5), and one or more locking grooves (6);

b) Drive system (7) including starter controls for the drive system (8), a support arm (9) and blade (10);

c) One or two extrusion chambers (11) including locking devices for the extrusion chamber (12), entrance cavity (13), exit cavity (14) and locking devices for the cavity (15), in case of performing a double coating the extrusion chambers form an intermediate cavity (17);

d) Feeding pump (18) including a feeding pump motor (19), feeding pipes (20), feeding pump motor regulator (21), manual activation/deactivation control for pump (22), and pressure sensor (23).

Figure 1:
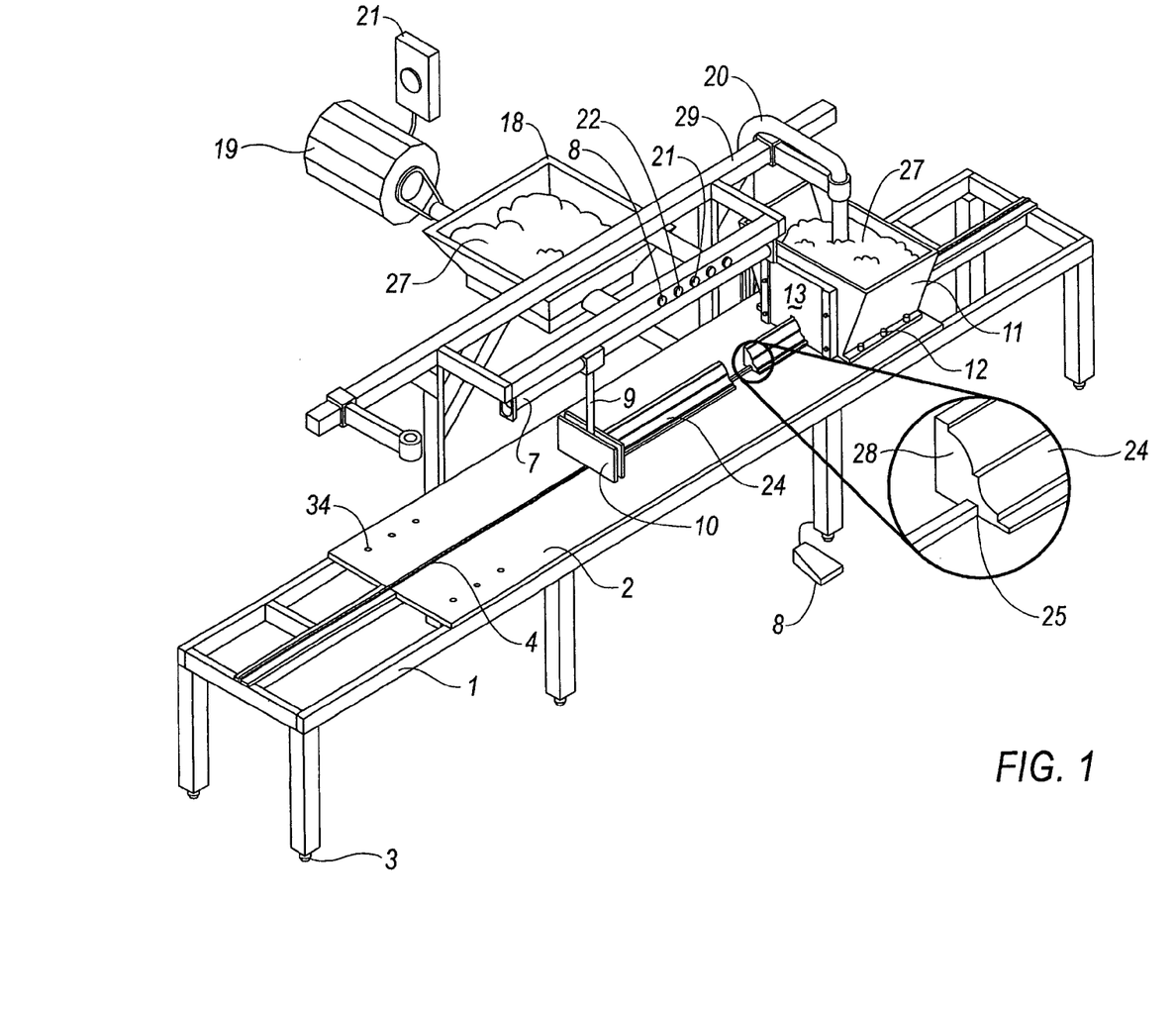
FIG. 1 shows a general perspective view of the apparatus of the present invention in its simplest embodiment, operating with an extrusion chamber, with a single piece being fed to be coated in one single step, and using a single coating material in the extrusion chamber.

FIG. 1 shows the apparatus (29) of the present invention in its more basic embodiment, with a single extrusion chamber (11), one coating material (27), and the feeding of a piece to be coated (24).

Figure 2:
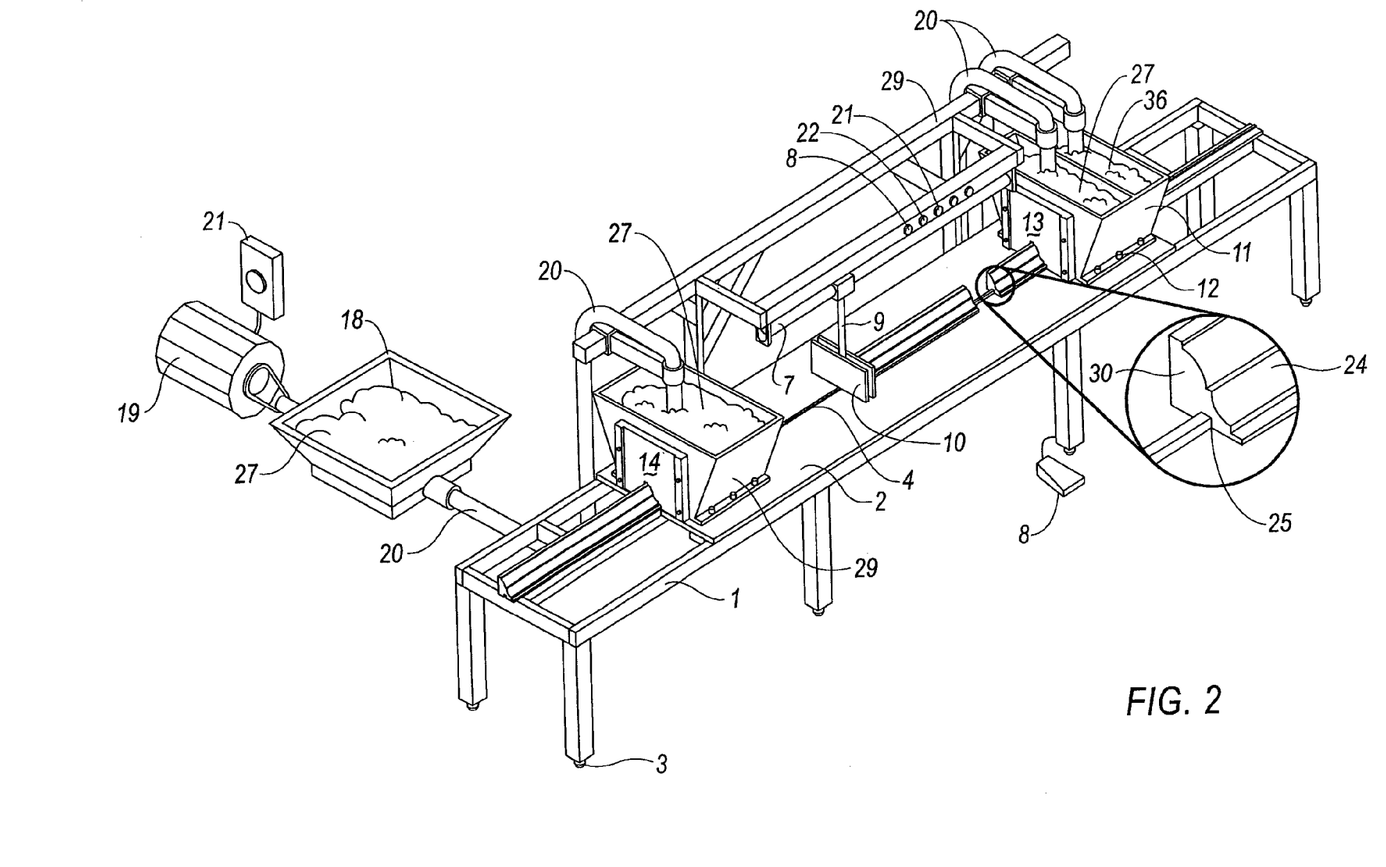
FIG. 2 corresponds to a perspective view of the apparatus of the present invention, operating with two extrusion chambers into which a single piece is introduced to be coated in one single step. The apparatus is shown operating two different models of pieces to be coated, in one instance only one coating material is adhered to it, and in the second case, two types of coating material are adhered to it.

However, in FIG. 2 the apparatus (29) of the present invention has a double extrusion chamber (11), double feeding of the coating material (27, 36) and feeding of a piece to be coated (24) into each of the extrusion chambers (11).

Figure 3:
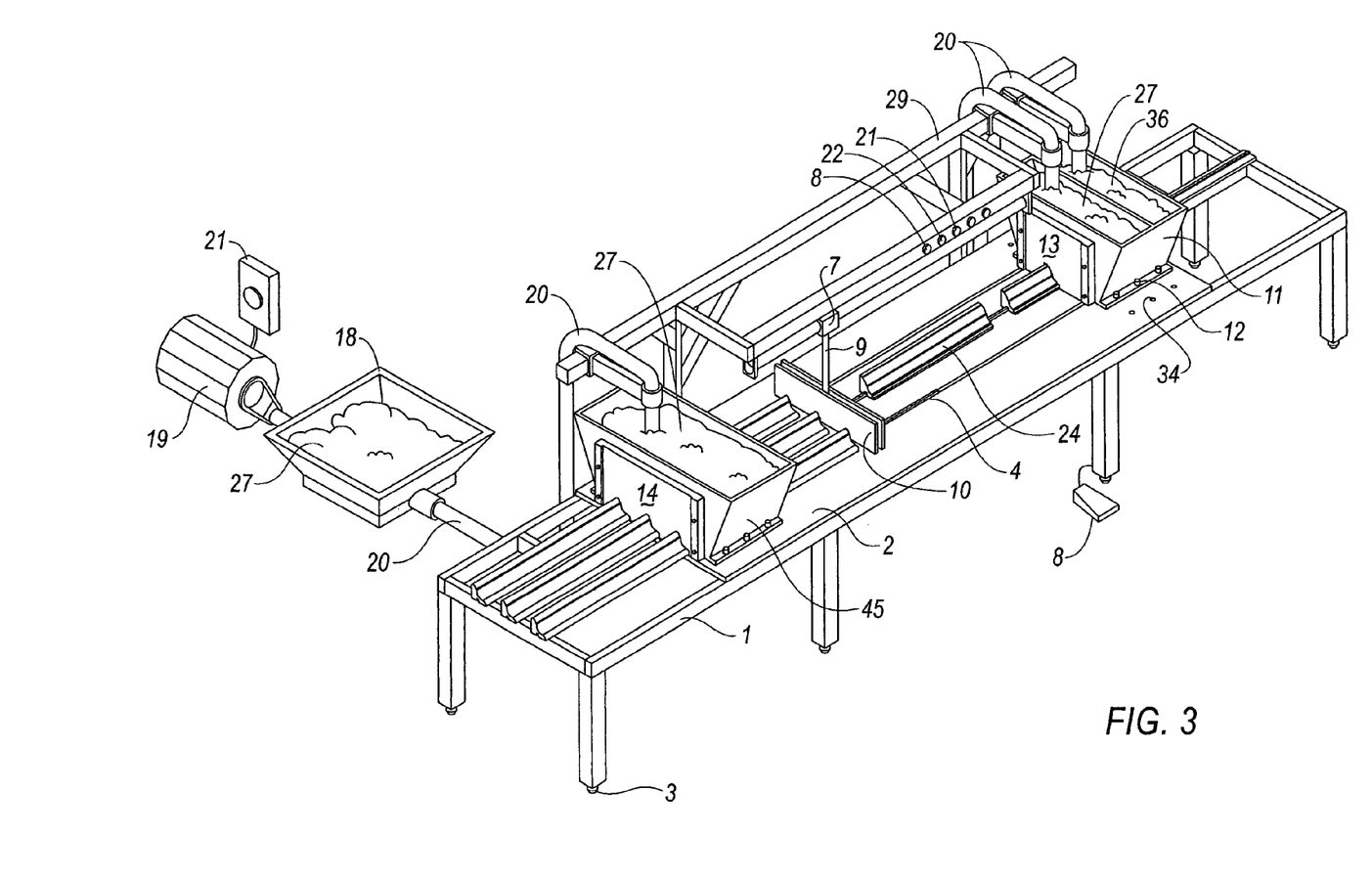
FIG. 3 shows a perspective view of the apparatus of the present invention, operating in a double extrusion chamber mode, one of which is fed with three pieces to be coated in one single step with a single type of coating material; and the other is fed with a piece to be coated in one single step with two coating materials.
Figure 4:
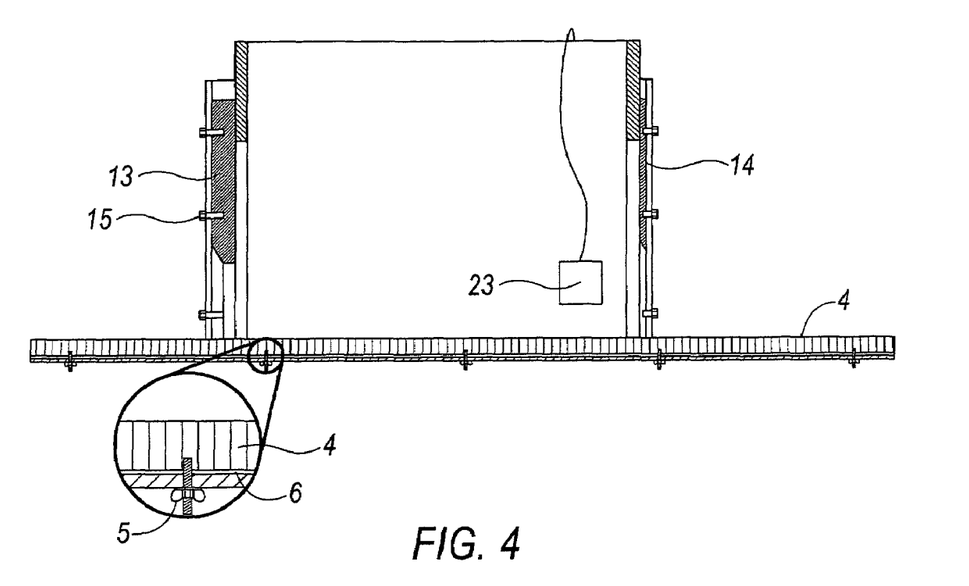
FIG. 4 corresponds to a side section view of the extrusion chamber of the apparatus of the present invention, showing the assembling of the entrance cavity and the exit cavity and the location of the pressure sensor.
Figure 5:
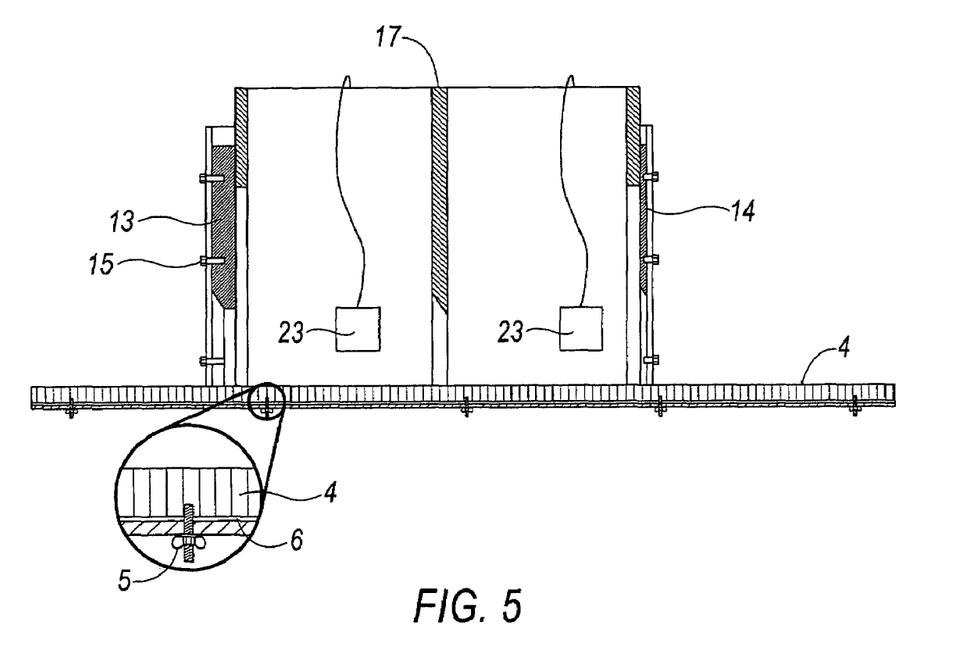
FIG. 5 shows a side section view of the extrusion chamber of the apparatus of the present invention, showing the assembling of the entrance cavity, exit cavity, intermediate cavity, and the location of the pressure sensors.
Figure 6:
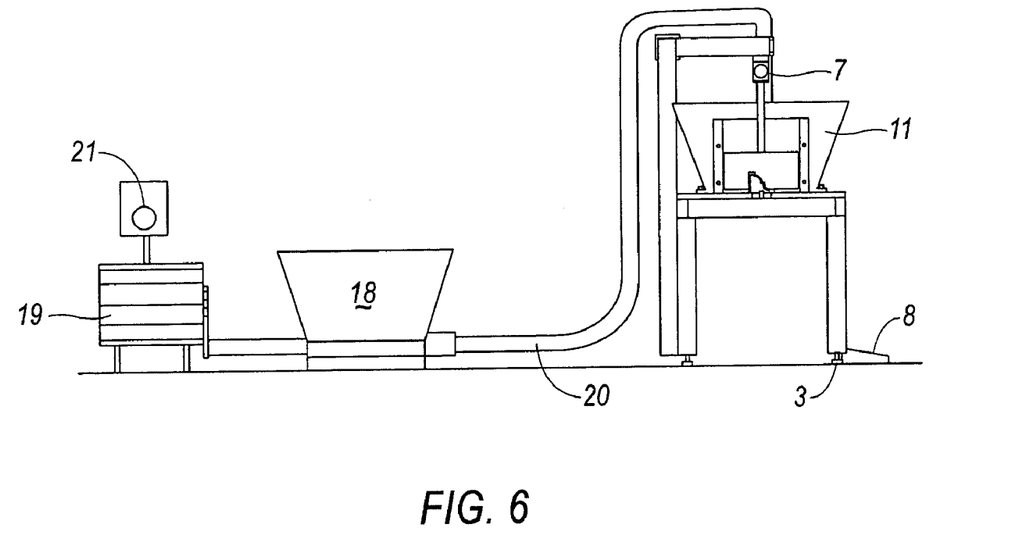
FIG. 6 corresponds to a lateral view of the apparatus of the present invention, showing the location of the main components among each other.

Referring to FIG. 3, the apparatus (29) of the present invention is shown with a double extrusion chamber (11), double feeding of the coating material (27, 36) and triple feeding of pieces to be coated (24).

The apparatus (29) of the present invention consists of a leveled table (1) having a low friction surface (2) and high resistance to humidity. Estimation of the weight supportability and stability of the table (1) should be sufficient to support the weight of the elements attached to it, as well as the weight of the materials it will support during the manufacturing process. The support legs of the table have independent level settings (3) to facilitate and assure leveling. For the construction of this leveled table (1) metallic materials are preferred, such as aluminum and the steel. Nevertheless, an alternative embodiment for the material of this component includes wood.

Figure 7:
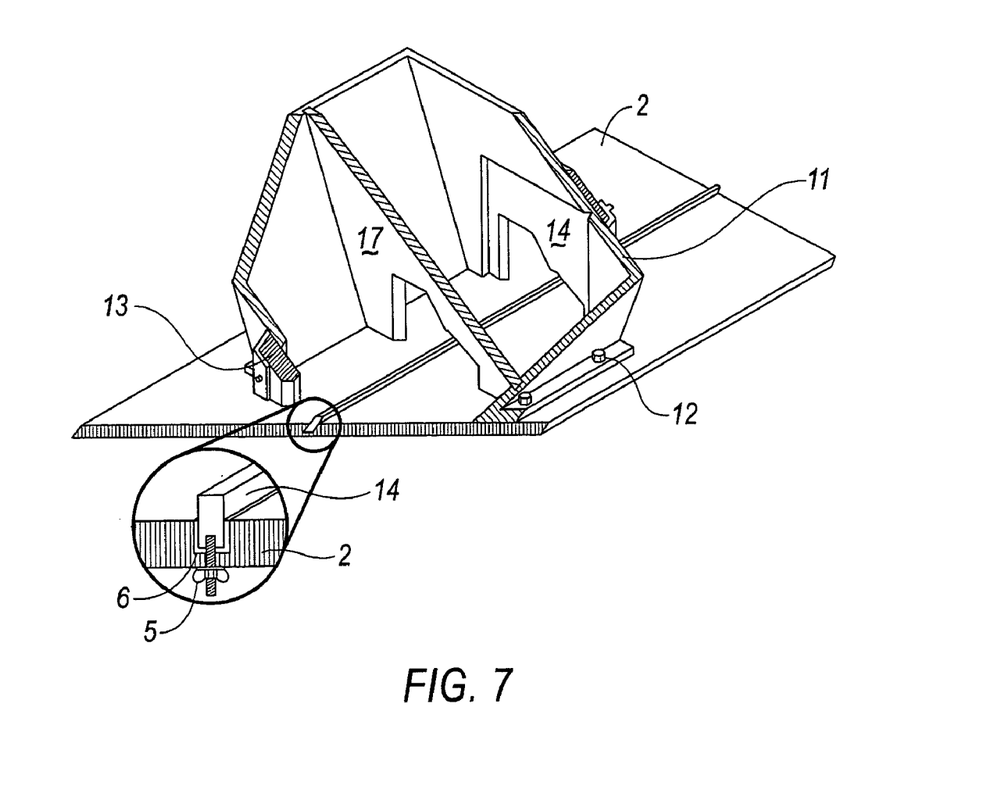
FIG. 7 shows a side section view of the extrusion chamber, the low friction surface, as well as a detail of the locking groove. and the guiding strip of the apparatus of the present invention.

In FIG. 7 locking groove (6) are shown on the low friction surface (2) of the leveled table (1), intending to be evenly located over the surface of the leveled table (1), in such a way that the guiding strip (4) can be easily installed and removed from the locking groove (6) by means of locking devices (5), which can be manually manipulated for a quick installation or removal of the guiding strips (4). In the preferred embodiment the guiding strip is of rectangular form having dimensions that range from 1 cm to 2 cm high, by 0.5 cm to 1 cm wide, and is preferably made of high resistance and durable material. The guiding strip (4) is placed in such a way that it overlaps parallel to the horizontal surface of the leveled table (1).

Figure 8:
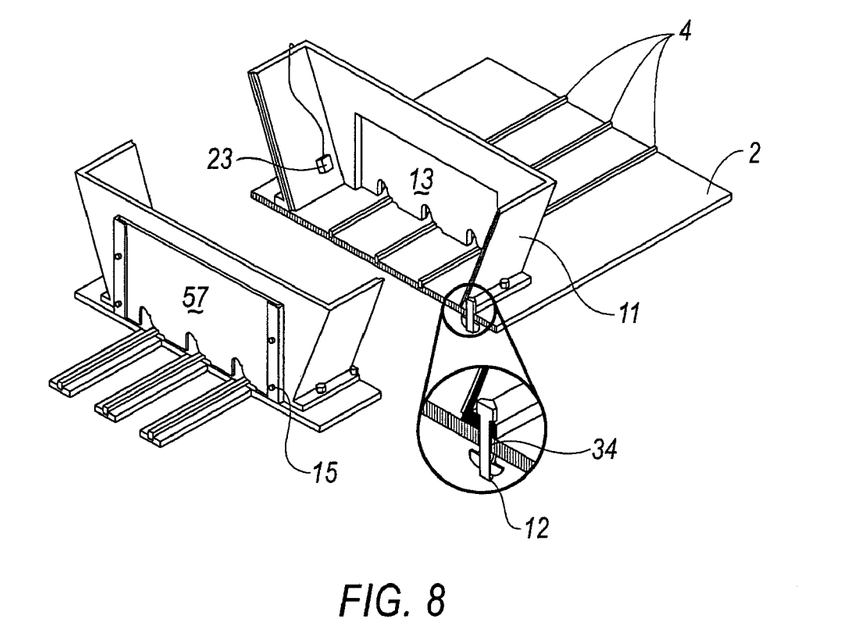
FIG. 8 corresponds to a side section view of the extrusion chamber of the apparatus of the present invention, capable of receiving three pieces to coat in one single step. Additionally showing a detail of the extrusion chamber-locking device.
Figure 9:
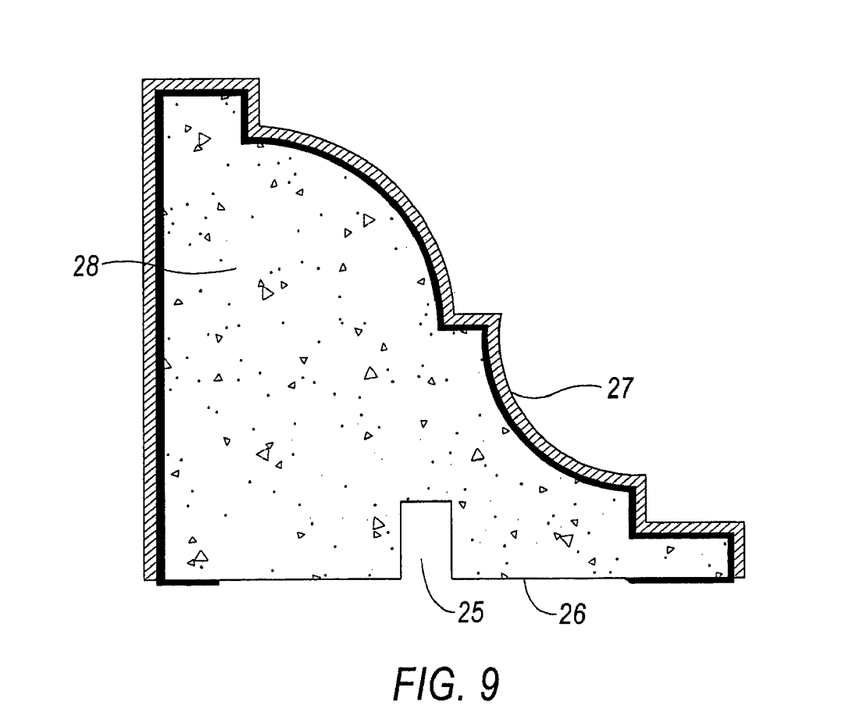
FIG. 9 shows a cross section view of the architectonic molding showing its main parts, clearly showing the guide opening of the piece to be coated.

FIG. 8 shows the embodiment of multiple guiding strips (4) parallel aligned to the others, when a multiple feeding is desired into the extrusion chambers (11). FIG. 8 shows the embodiment of the entrance cavity (13) and exit cavity (14) with a triple shape, each corresponding to each guiding strip (4). The piece to be coated (24) must be previously grooved to have a guide opening (25), see detail in FIG. 9, on the flat area (26) of the piece to be coated (24), by a cutting or molding process. It should be mentioned that the flat area (26) of the piece to be coated (24) is not coated with the coating material (27), since this area will be adhered to the surface on which the architectonic molding is to be placed (28) (final product).

FIG. 2 shows that the dimensions of the guide opening (25) correspond to those of the guiding strip (4), in such a way that when the piece to be coated (24) is being placed on the guiding strip (4), the fit between both components matches and allow the piece (24) to move exactly on the guiding strip (4) when horizontally pushing one of its lateral ends (30), which is cut vertically.

Figure 10:
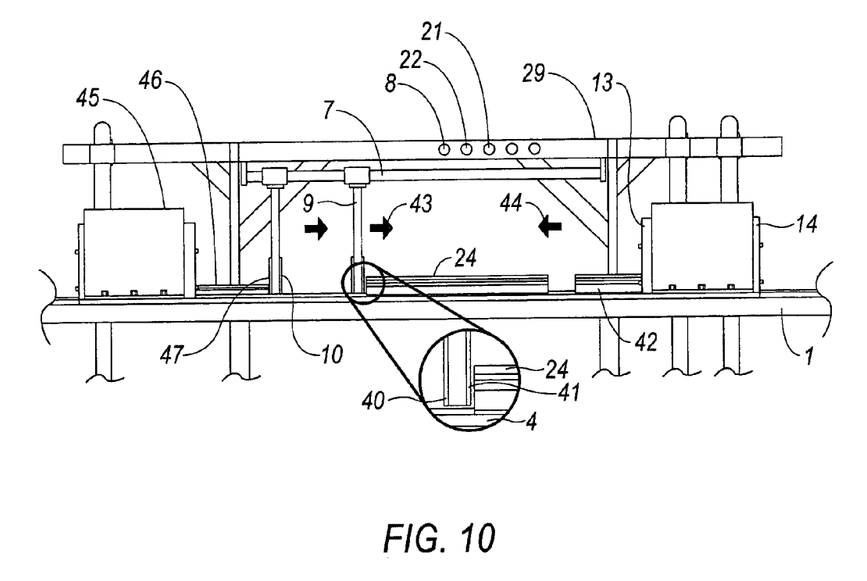
FIG. 10 represents the drive system of the apparatus of the present invention, representing the bi-directional movement with the introduction of the pieces to be coated into each of the extrusion chambers.

FIG. 10 explains the difference between the apparatuses of the prior art, which move the pieces on traveling bands, located either lateral or below to the table, and the apparatus (29) of the present invention which uses a blade (10) that overlaps in a small distance (40) over the guiding strip (4), preferably in a few millimeters, and upon placing the piece to be coated (24) on this guiding strip (4), one of the ends of the piece contacts one of the sides of the blade (10), both sides being vertically parallel, and flat (41). With the previous configuration, the blade (10) contacts most part of the lateral ends (30) of the piece (24) supporting it. This blade (10) is fixed to a drive system (7) by means of a support arm (9). The drive system (7) can be electromechanical, pneumatic or a combination of both; and it clears the low friction surface (2) of the leveled table (1).

The drive system (7) is activated by an operator who places the pieces to be coated (24) on the guiding strip (4), and actuates the manual or pedal start control (8) of the drive system (7) immediately after placing the piece to be coated (24) on the guiding strip (4). This drive system (7) moves the newly placed piece to be coated (24), which in turn moves another similar piece (42) previously placed during a previous stage. This piece to be coated (42) is the one that in the run (43) leaves the extrusion chamber completely coated (11), whereas the piece to be coated (24) which has just been placed is partially inside the extrusion chamber (11), sealing the entrance cavity (13) and the exit cavity (14), in such a way that the semi fluid coating material (27) contained in the extrusion chamber (11) is not spilled.

Upon conclusion of the previous stage, you can choose to return (44) the blade (10) to its previous position to place back another piece to be coated (24) into the same extrusion chamber (11) and continue the process of production with the use of a single extrusion chamber (11), or you can decide to have a bi-directional system with double extrusion chamber (45). In this bi-directional system, the operator places another piece to be coated (46) on the same guiding strip (4), but now at the other face of the blade (47), which initiates a new run in reverse sense (44), moving the other pair of pieces to be coated (46) towards the second extrusion chamber (45), placed at the opposite side of first one. It must be mentioned that these pieces to be coated (46) may or may not be of the same shape as the first one. In this way, the apparatus (29) of the present invention operates with one double extrusion chamber (11 and 45) on the same leveled table (1), the same guiding strip (4) and the same drive system (7). This can be carried out because the drive system (7) can operate in a bi-directional way (43 and 44), thereby allowing the production of different models of architectonic moldings simultaneously, conferring twice the versatility of production in comparison with the prior art which operates unidirectional producing a single type of architectonic molding during the cycle of operation.

FIG. 3 shows how the apparatus (29) of the present invention significatively increases the productivity because a trained operator with certain experience and depending on the size of the pieces to be coated (24) can place two or more pieces to be coated (24) on two or more guiding strips (4). Considering the previous adjustment, the same blade (10) can simultaneously introduce two or more pieces to be coated (24) into the same extrusion chamber (45). The benefits of this adjustment considerably improve the efficiency, and productivity of the apparatus (29) of the present invention. Comparatively, the apparatuses of the prior art do not present the option to either include a double extrusion chamber (11 and 45) or the possibility of introducing two or more pieces to be coated (24) into the extrusion chambers (11 and 45), because they are unidirectional equipment that operates with a single extrusion chamber.

Another great advantage of the apparatus (29) of the present invention is that both extrusion chambers (11 and 45) operate individually, so that the apparatus (29) of the present invention does not stop the production process when a change of the extrusion chambers (11 and 45) is needed for any modification or at the beginning of the production of another model of a piece to be coated (24). Of course, this feature renders the apparatus (29) of the present invention a greater efficiency and productivity in relation to the ones which operate in a single direction and with a single box requiring a total stop if the operation to carry out the preparation process for changing the shape or model of piece to be coated (24).

Figure 11:
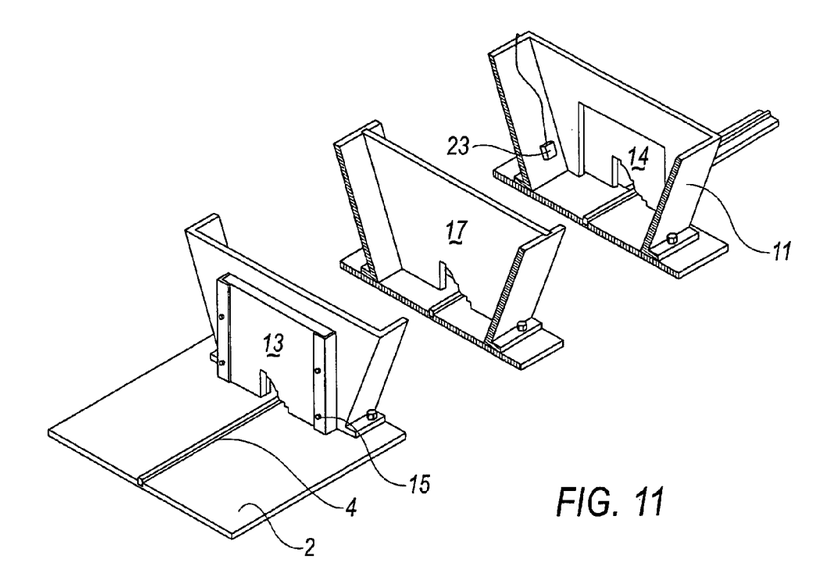
FIG. 11 shows a side section view and perspective view of the extrusion chamber of the apparatus of the present invention, with the entrance cavity, exit cavity and intermediate cavity; and capability to receive a piece to be coated in one single step.

FIG. 11 shows a sectional view of the extrusion chamber (11) of the present invention (29), which consists of an open drawer having an entrance cavity (13), an exit cavity (14), and a third optional cavity, called intermediate cavity (17), which is aligned in parallel, and comprises the extrusion chamber (11), the shape of which corresponds to that of the piece to be coated (24).

Figure 12:
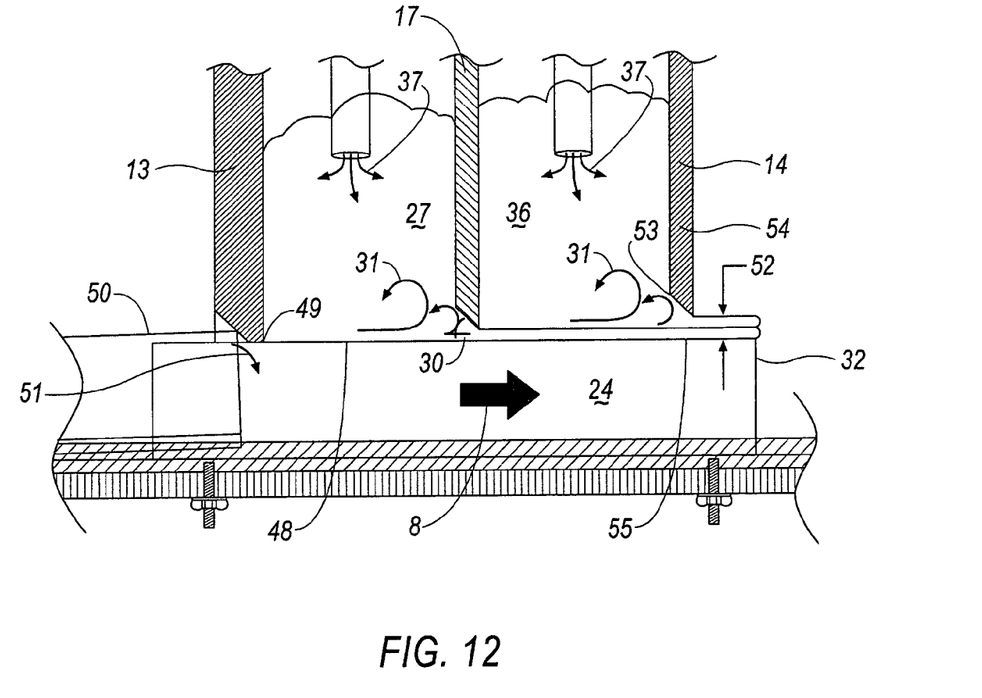
FIG. 12 shows a side section view of the extrusion chamber of the apparatus of the present invention, when the piece is to be coated with two coating materials.

FIG. 12 shows the outer area of the wall of the entrance cavity (13) having a bigger shape than the shape of the piece to be coated (48), which gets smaller in size as it passes through the wall of the entrance cavity (13), until reaching the inner area of the wall of the entrance cavity (49), the dimensions in this area are exactly the same as the ones of the piece to be coated (24). This characteristic is in order that the piece to be coated (24) is received by the outer part and, in case of coming uneven or misadjust after the run (50), which can be due to the rapidity with which the operator places the piece to be coated (24) on the guiding strip (4), the own apparatus (29) of the present invention adjusts this leveling (51) at the moment of the entrance of the piece for coating (24) towards the extrusion chamber (11). With this adjustment, the alignment between the pieces assures the coating (24) and the extrusion chamber (11), which provides uniformity in the thickness of the coating material (27).

However, the desired thickness of the coating material (52) is determined by the exit cavity (14), which in the outer part has a shape proportionally equal to the contour of the piece to be coated (24), but increasing according to the desired thickness of the coating material (52). A preferred embodiment of thickness is mentioned to have a range of between 1 mm and 7 mm.

Also, the inner contour of the exit cavity (53) is bigger than the outer contour of the exit cavity (54), satisfying an angle between the surface of the piece to be coated (55) and the exit cavity (14). This angle causes that during the movement of the piece to be coated (24), the coating material (27) presents a circular movement (31) in the final stage of exit of the coating process, which favors a smooth finishing and evenness (32).

In FIG. 8 another section view of the modified extrusion chamber (11) appears to be used with cavities of triple contour (57). For the removal and relocation of the cavities, cavity-locking devices are used (15), which assure the correct position of these cavities (57). The low friction surface (2) includes fixation openings (34), on which the extrusion chamber locking devices are placed (12), which can be manipulated manually and without the need of a special tool, reducing the time for changing an extrusion chamber (11) with another.

FIG. 12 shows an embodiment of the present invention (29) consisting of an extrusion chamber (11) which can be modified to obtain a certain thickness, finishing and reinforcement of the pieces to be coated, by means of adding an intermediate cavity (17) to the extrusion chamber (11), creating that way two independent deposits (35) for the coating material (27), which allows the piece to be coated (24) with two different materials (27 and 36), simultaneously. With the same adjustment of said exit cavity (14), an intermediate cavity (17) with dimensions proportionally bigger is previously placed on the contour of the piece to be coated (24). This increase must be smaller than the increase of the exit cavity (14), in such a way that it allows the second coating (36) to have an equal thickness in relation to the difference between the dimensions of the exit cavity (14) and the dimensions of the intermediate cavity (17). By means of this embodiment, new characteristics in the coating of the molding are obtained, because coating materials are combined (27 and 36) which have different characteristics. The experts in the art of material properties, know that the possibility of obtaining a coating simultaneously with two different coating materials (27 and 36), offers great advantages, because they can be combined, for example, one being a primer for a coating material (27) with properties of high resistance to the impact, with a second layer of the coating material (36) that offers fine and smooth properties of high finishing resistance to the weathering.

In FIG. 10 is observed the drive system (7) that comprises the apparatus (29) of the present invention, and where the run (distance) of the drive system (7) can easily be fit to the dimension of the piece to be coated (24). Generally and considering the length of the apparatus (29) and the length of the drive system (7), the length of the pieces to be coated can be from 0.50 m to 2 m. Usually, the length of the piece to be coated (24) is of 1.22 m so this dimension allows the easy packing and handling of the architectonic molding in a commercial scale.

In FIG. 2, the apparatus (29) of the present invention is observed as it is fed with the coating material (27) towards the extrusion chamber (11) by means of the feeding pump (18), which moves the coating material (27) through feeding pipes (20). This feeding can be handled in two forms: first it is automatic, by means of the use of a pressure sensor (23) (see FIG. 11) that regulates the inner pressure of the extrusion chamber (11), this sensor is adjusted down to a maximum and a predetermined minimum of the pressure value, so that the activation of the feeding pump is carried out (18); second, it is manual, done by the operator, who when observing the maximum and minimum levels of the coating material (27) which are within the extrusion chamber (11), through the superior opening of the extrusion chamber (11), activates or deactivates the feeding pump (18) by means of the manual activation control of the pump (22).

The flow of the coating material (27), is determining by the feeding speed (37) (see FIG. 12), which is as well controlled by a feeding pump motor regulator (21). Depending on the size and number of pieces to be coated, the feeding speed (37) of the coating material (27) to the extrusion chamber will be determined (11).

The apparatus (29) of the present invention allows the use of a great range of characteristics in the coating material (27), due to its feeding capacities of the coating material (27) and run speed of the drive system (7). By the above-said, it can handle different densities, viscosities and other characteristics of the coating material (27), to obtain very specific properties and appearance results during the coating of the architectonic molding.

In the formulation of the coating material (27), it is emphasized to formulate them so as to include cement, sands of different types, polymers and chemical additives to obtain the characteristics you specify. A characteristic that is commonly looked for in all the formulations of the coating material (27) is the adhesion to the piece to be coated (24), in such a way that once forged, the coating material (27) is impossible to separate the piece to be coated (24) without the same architectonic molding undergoing a deterioration. As an included optional characteristic in the coating material (27) the lack of air bubbles in its final appearance is of a smooth and uniform surface. Nevertheless, the apparatus (29) of the present invention can use different materials and you can formulate the coating material (27) according to the characteristics that are desired in the final coating, being possible to obtain appearances varying from a smooth and uniform, up to porous and irregular finishing that emulates a stony appearance.

As is mentioned in previous paragraphs, the present invention also relates to a method that allows to give greater versatility and efficiency to the process of coating the previously cut or molded pieces, obtaining a greater productivity and consequently a better production cost, comparatively to the methods used in the art of commercial scale manufacture of architectonic moldings. The main differences between the present method and the known ones in the art, consist of the advantages of this method being able to operate bi-directionally with one double extrusion chamber (11 and 45), each one being fed when operating the apparatus (29) in one direction; the optional capacity to multiply feed these chambers (11 and 45) when relying on a drive system (7) that can move two or more pieces to be coated (24, 42 and 46) simultaneously; the capacity of the method to operate continuously, without the need to stop completely its operation when doing the necessary changes of preparation when changing the models of pieces to be coated (24, 42 and 46); in addition to the option of coating with two materials (27 and 36) the same piece (24) when passing through the extrusion chamber (11).

The method of coating decorative moldings, consists of the following stages:

1. Determination of the flow of the coating material.
2. Positioning of the piece to be coated on the leveled table.
3. Movement of the piece to be coated towards the extrusion chamber.
4. Coating of the piece
5. Drying of the coated piece The first stage of the process of the present invention consists of determining the flow volume of the coating material (27) that is deposited in the extrusion chamber (11), as well as its manual or automatic form of feeding.

It is important that the extrusion chamber (11) is constantly fed with the coating material (27) during the process of operation of the apparatus (29), due to the determination of the flow level of the coating material (27) that enters the extrusion chamber (11), which depends on the size and development of the contour of the piece to be coated (24) and of the number of pieces to be coated (24) in each step. The bigger the size and number of pieces introduced in the extrusion chamber (11), the bigger the flow volume of the coating material (27) that feeds the chamber (11). This method allows selecting, if this feeding were carried out automatically or by means of a manual control for the feeding pump (18). In the case of the manual control, the control method consists of driving the manual control for the activation/decontamination of the pump (22) that puts in operation the feeding pump (18), which is driven by a feeding pump motor (19) and a feeding pump motor regulator (21) which cause the coating material (27) to flow in a certain flow volume. The automatic method regulates automatically by means of using an installed accessory in the lower part of the extrusion chamber (11), when turning off and igniting the pressure sensor (23), depending on the level of maximum and minimum pressure of the coating material (27) it reaches in the lower part of the extrusion chamber (11).

In practice, usually the manual form is used to carry out the preparation tasks of the process, and once the conditions of operation in series are had, it changes to the automatic feed form. Nevertheless, any form of feeding control is effective.

The second stage of the process of the present invention consists in placing the piece to be coated (24), previously grooved, within the guiding strip (4) of the leveled table (1), taking care that its positioning completely corresponds to the guide opening (25) of the piece to be coated (24) and the guiding strip (4) on which the piece moves (24). In this stage, it is necessary that the piece to be coated (24) be installed in such a way that one of the ends of the piece to be coated (30) is in contact with one of the sides of the blade (10). According to the embodiment in which this process is being carried out, which can be unidirectional (feeding of a single extrusion chamber (11) towards a single direction), bi-directional (feeding of two extrusion chambers (11 and 45) towards a two-way opposing direction), and with the feeding of one or several pieces to be coated (24, 42 and 46) per step. The described stage is promptly carried out by an operator, who after assuring the correct positioning of the piece(s) to be coated (24, 42 and 46) will start up the stage of causing the piece(s) to move.

The third stage of the process of the present invention, consists of moving the piece to be coated (24) towards the extrusion chamber (11), which is obtained by means of the activation of the drive system (7), which moves the piece to be coated (24) with the blade (10), which is the one that makes contact with one of the ends (30) of the piece to be coated (24). During the transport, the piece to be coated (24) is received by the entrance cavity (13), which is the same that comprises the extrusion chamber (11), which presents a widened version of the contour of the piece to be coated (24), aligning that way the piece to be coated (24) with the cavities of the extrusion chamber (11).

The fourth stage of the process of the present invention, consists of the coating of the piece to be coated (24), which consists of the passage of the piece to be coated (24) through the extrusion chamber (11), the coating material (27) properly adheres to the exposed surface of the piece to be coated (24). The aforementioned is possible due to the physical characteristics you specify in the coating material (27) and the surface of the piece to be coated (24). The resulting thickness of the coating, is the one obtained by a difference of dimensions on the entrance cavity (13) of the extrusion chamber (11), which is exactly similar in its contour and dimensions to the piece to be coated (24), and the exit cavity (14), which has a proportionally bigger dimension, the difference is the desired thickness of the coating. In this method, it is extremely important to have a correct alignment among the piece being coated (24), the extrusion chamber (11), the entrance (13), and the exit (14) cavities because the uniformity of the dimensions of the coating depends on accuracy.

The fifth stage of the process of the present invention is drying the just coated pieces, for which it is possible to use alternatives methods. One consists in horizontally placing the coated piece on drying cars, specially designed to contain the coated piece during the process of ageing of the coating material (27). In this option, it is advisable that the coated pieces remain in an area with controlled temperature and humidity, to provide the ideal conditions for the coating material (27) to age. These conditions depend on the type of coating used, which can vary from ideal cement-based coatings to conditions for 100% polymer-based coatings; reason why the ranges of conditions are different in each case. The preparation of the drying area can go from a room with slow drying conditions, where natural conditions of heat and humidity are not altered greatly making the process economic but slow, to conditions of high alteration of temperature and humidity that can include steam to accelerate the aging process. In these last cases, it is required that the drying cars are preferably constructed of a humidity resistant material.

Another embodiment of the drying stage consists of giving continuity to the manufacturing process by a continuous movement of the coated piece leaving the extrusion chamber (11), by using conveying bands which receive coated piece, and to take it immediately to a drying furnace, where the piece undergoes a process of accelerated drying, and then continue towards the stages of finishing and packing.

The convenience of one or another of the embodiments is based on the type of coating used and the degree of automation and speed of production desired. It is important to mention that by this method it is possible to reach levels of production time per day where the piece to be coated (24) is coated, dried, prepared for its labeling, labeled and packed on the very same day.

Based on the previous disclosure, certain embodiments and details have been described with the purpose of illustrating the present invention, and it will be evident for the experts in the art variations and modifications thereto without departing from the scope of the invention.

What is claimed is:

1. An apparatus for manufacturing decorative moldings from pieces previously cut or molded from different materials, wherein the apparatus comprises:
    a leveled table;
    a drive system for moving a piece to be coated along the leveled table;
    one or more extrusion chambers into which the piece to be coated is fed; and
    a feeding pump for providing coating material to the one or more extrusion chambers,
    wherein the leveled table includes a low friction surface, independent height settings, one or more guiding strips, locking devices for the guiding strip, and one or more locking grooves.

2. The apparatus according to claim 1, wherein the drive system includes start controls for the drive system, a support arm and a blade.

3. The apparatus according to claim 2, wherein the blade overlaps a small distance over the guiding strip and, upon placing the piece to be coated on the guiding strip, it contacts one of the ends of the piece to be coated and on one of the sides of the blade, offering support.

4. The apparatus according to claim 2, wherein the blade is attached to the start controls for the drive system by the support arm.

5. The apparatus according to claim 2, wherein the drive system can be electromechanical, pneumatic or a combination of both, and clears the low friction surface of the leveled table.

6. The apparatus according to claim 1, wherein the one or more extrusion chambers include extrusion chamber locking devices, an entrance cavity, an exit cavity and cavity locking devices.

7. The apparatus according to claim 6, wherein the one or more extrusion chambers are two extrusion chambers, and said extrusion chambers are further comprised of one intermediate cavity.

8. The apparatus according to claim 7, wherein the intermediate cavity generates two independent deposits for the coating material within the extrusion chamber, which allows the piece to be simultaneously coated with two different materials.

9. The apparatus according to claim 6, wherein the one or more extrusion chamber comprise an open drawer having an entrance cavity, an exit cavity, and a third optional cavity, called intermediate cavity, which is aligned in parallel to the entrance cavity and the exit cavity and has a shape corresponding to the shape of the piece to be coated.

10. The apparatus according to claim 6, wherein the outer area of the wall of the entrance cavity has a proportionally bigger shape than the shape of the piece to be coated, which gets smaller as it passes through the wall of the entrance cavity, until reaching the inner area of the wall of the entrance cavity, the dimensions at this area are exactly the same as the dimensions of the piece to be coated, this adjustment serves to fix any unevenness.

11. The apparatus according to claim 10, wherein the elimination of unevenness upon entrance of the piece into the extrusion chamber assures the alignment between the piece to be coated and the extrusion chamber, providing uniformity in the thickness of the coating material.

12. The apparatus according to claim 6, wherein the exit cavity determines the thickness of the coating material.

13. The apparatus according to claim 1, wherein the feeding pump includes a feeding pump motor, feeding pipes, a feeding pump motor regulator, a manual activation/deactivation control for the pump, and a pressure sensor.

14. The apparatus according to claim 1, wherein the locking grooves are located at small distance from the surface of the leveled table, such that the guiding strip can be easily installed and removed from the locking groove by using guiding strip locking devices.

15. The apparatus according to claim 1, wherein the guiding strips are aligned parallel to each other, when it is desired a multiple feeding into the one or more extrusion chambers.

16. The apparatus according to claim 1, wherein the piece to be coated is previously grooved to generate a guide opening, the dimensions of which corresponds to the dimensions of the one or more guiding strips, such tat both components match to each other and allow the piece to be moved.

17. The apparatus according to claim 1, wherein the extrusion chambers operate individually.

18. An apparatus for manufacturing decorative moldings from pieces previously cut or molded from different materials, wherein the apparatus comprises:
    a leveled table;
    a drive system for moving a piece to be coated along the leveled table;
    one or more extrusion chambers into which the piece to be coated is fed; and
    a feeding pump for providing coating material to the one or more extrusion chambers,
    wherein the drive system includes start controls for the drive system, a support arm and a blade.

19. The apparatus according to claim 18, wherein the leveled table includes a low friction surface, independent height settings, one or more guiding strips, locking devices for the one or more guiding strips, and one or more locking grooves.

20. The apparatus according to claim 19, wherein the locking grooves are located at small distance from the surface of the leveled table, such that the guiding strip can be easily installed and removed from the locking groove by using guiding strip locking devices.

21. The apparatus according to claim 19, wherein the guiding strips are aligned parallel to each other, when it is desired a multiple feeding into the one or more extrusion chambers.

22. The apparatus according to claim 19, wherein the piece to be coated is previously grooved to generate a guide opening, the dimensions of which corresponds to the dimensions of the one or more guiding strips, such that both components match to each other and allow the piece to be moved.

23. The apparatus according to claim 19, wherein the blade overlaps a small distance over the guiding strip and, upon placing the piece to be coated on the guiding strip, it contacts one of the ends of the piece to be coated and on one of the sides of the blade, offering support.

24. The apparatus according to claim 19, wherein the drive system can be electromechanical, pneumatic or a combination of both, and clears, the low friction surface of the leveled table.

25. The apparatus according to claim 18, wherein the one or more extrusion chambers include extrusion chamber locking devices, an entrance cavity, an exit cavity and cavity locking devices.

26. The apparatus according to claim 25, wherein the one or more extrusion chambers are chambers and said extrusion chambers are further comprised of one intermediate cavity.

27. The apparatus according to claim 26, wherein the intermediate cavity generates two independent deposits for the coating material within the extrusion chamber, which allows the piece to be simultaneously coated with two different materials.

28. The apparatus according to claim 25, wherein the outer area of the wall of the entrance cavity has a proportionally bigger shape than the shape of the piece to be coated, which gets smaller as it passes through the wall of the entrance cavity, until reaching the inner area of the wall of the entrance cavity, the dimensions, at this area are exactly the same as the dimensions of the piece to be coated, this adjustment saves to fix any unevenness.

29. The apparatus according to claim 28, wherein the elimination of unevenness upon entrance of the piece into the extrusion chamber assures the alignment between the piece to be coated and the extrusion chamber, providing uniformity in the thickness of the coating material.

30. The apparatus according to claim 25, wherein the exit cavity determines the thickness of the coating material.

31. The apparatus according to claim 18, wherein the feeding pump includes a feeding pump motor, feeding pipes, a feeding pump motor regulator, a manual activation/deactivation control for the pump, and a pressure sensor.

32. The apparatus according to claim 18, wherein the blade is attached to the start controls for the drive system by the support arm.

33. The apparatus according to claim 18, wherein the extrusion chambers operate individually.

34. The apparatus according to claim 18, wherein the one or more extrusion chambers comprise an open drawer having an entrance cavity, an exit cavity, and a third optional cavity, called intermediate cavity; which is aligned in parallel to the entrance cavity and the exit cavity and has a shape corresponding to the shape of the piece to be coated.

* * * * *

UNITED STATES PATENT AND TRADEMARK OFFICE
CERTIFICATE OF CORRECTION

PATENT NO. : 6,994,752 B2 Page 1 of 1
APPLICATION NO. : 10/676693
DATED : February 7, 2006
INVENTOR(S) : Estrada et al.

It is certified that error appears in the above-identified patent and that said Letters Patent is hereby corrected as shown below:

Column 14, Line 48, please delete "tat" and insert --that--.

Column 15, Line 26, please delete "," after clears.

Column 15, Line 33, please insert "two extrusion" after chambers are.

Column 16, Line 11, please delete "saves" and insert --serves--.

Signed and Sealed this

Fifteenth Day of August, 2006

JON W. DUDAS
*Director of the United States Patent and Trademark Office*